Nov. 20, 1945.   P. V. WHITWORTH   2,389,174
POWER TRANSMITTING UNIT
Filed Sept. 2, 1942   2 Sheets-Sheet 1

INVENTOR.
PERRY V. WHITWORTH
BY Munn, Liddy & Glaccum
ATTORNEYS

Nov. 20, 1945.   P. V. WHITWORTH   2,389,174
POWER TRANSMITTING UNIT
Filed Sept. 2, 1942   2 Sheets-Sheet 2

INVENTOR.
PERRY V. WHITWORTH
BY
Nunn, Liddy & Slocum
ATTORNEYS

Patented Nov. 20, 1945

2,389,174

UNITED STATES PATENT OFFICE 2,389,174

POWER TRANSMITTING UNIT

Perry V. Whitworth, El Cerrito, Calif.

Application September 2, 1942, Serial No. 457,105

1 Claim. (Cl. 60—54)

The present invention relates to improvements in a power transmitting unit and it consists of the combinations, constructions and arrangements hereinafter described and claimed.

An object of my invention is to provide a power transmitting unit which is self contained and which makes use of hydraulic means as the motive medium between the drive and the driven members. The device does away with the necessity of providing a clutch between the originating source of power and the drive and driven members of my power transmitting unit, and also eliminates the necessity of using a gear shift mechanism.

The device makes use of a fluid drive in which a flowing fluid is the medium used for connecting the drive and driven members together. Fluid directing means is placed between the drive and driven members and this means may be manually controlled for causing the fluid to rotate the driven member in the desired direction and at any desired speed from neutral up to the highest speed which the driven member is capable of performing.

The device not only makes use of a moving fluid for connecting the drive and driven members together and for controlling the speed of rotation of the driven member in either direction, but it also provides a return passage for the fluid so that it may be used over and over again. In fact the fluid moves through an endless path while transmitting power from the drive to the driven member.

Other objects and advantages will appear in the following specification, and the novel features of the device will be particularly pointed out in the appended claim.

My invention is illustrated in the accompanying drawings forming a part of this application, in which.

Figure 1:
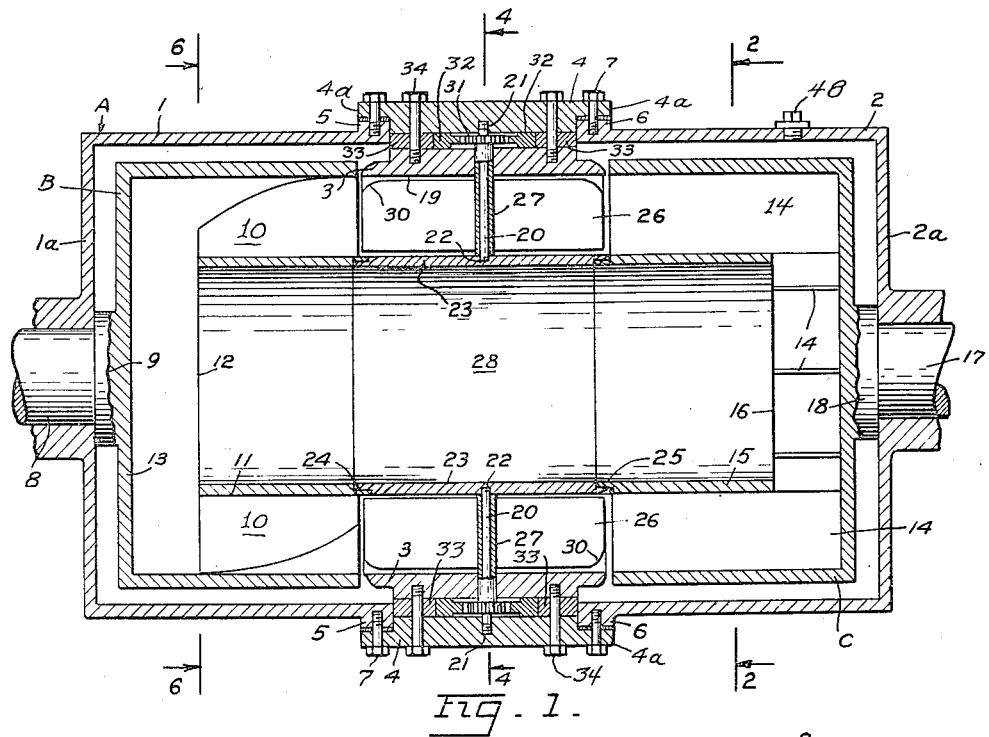
Figure 1 is a longitudinal section through the device, portions being shown in elevation.
Figure 2:
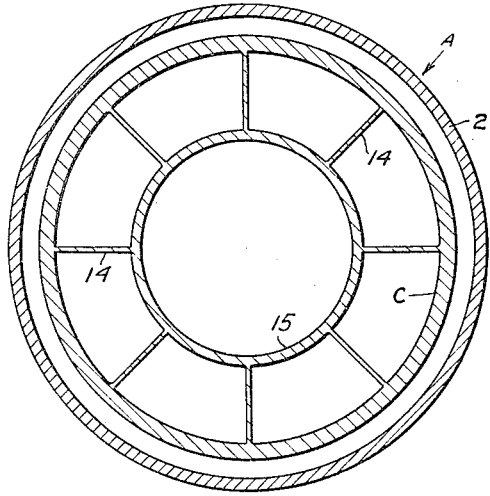
Figure 2 is a section along the line 2—2 of Figure 1.

In carrying out my invention I provide a housing or casing A that is preferably cylindrical in shape. The casing may be constructed in any manner desired and I have shown it composed of two end members 1 and 2 and a central cylindrical member composed of an inner part 3 and an outer part 4. The ends 1 and 2 are cup-shaped and have flanged rims 5 and 6 for receiving the circular flanges 4a of the outer part 4. Cap screws 7 secure the flanges 4a to the flanges 5 and 6.

Figure 3:
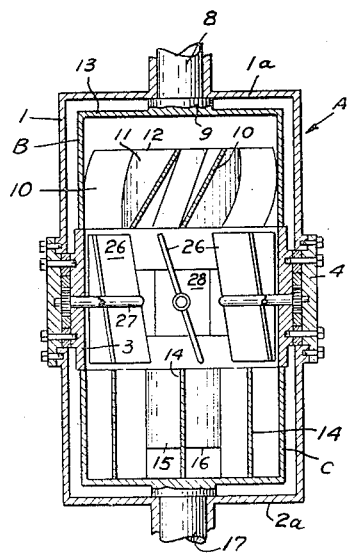
Figure 3 is a horizontal section showing the device on a reduced scale, certain portions being shown in elevation.

Before describing the inner part 3 and its associate fluid control mechanism, it is best first to describe the power unit and the driven unit which are mounted in the casing A. The power or drive unit B is illustrated in Figure 1 and comprises a cup-shaped member mounted on and rotated by a shaft 8 that extends through the end wall 1a of the casing. A thrust bearing 9 is placed between the unit B and the end wall 1a of the end member 1. The member B has vanes 10 that extend inwardly from the cylindrical portion of the member and carry a tubular member 11 at their inner edges. It will be noted from Figure 1 that the outer end of the tube 11 lies substantially flush with the rim of the member B while the inner end 12 of the tube is spaced from the bottom 13 of the cup B. The vanes 10 have a length coextensive with the length of the tube 11 and they therefore terminate short of the cup bottom 13. Figure 3 illustrates the vanes 10 as extending spirally with respect to the longitudinal axis of the member B. In actual practice the vanes may be helical in shape for exerting a thrust on the fluid contained in the housing A and outside of the tube 11 for moving the fluid from the end 1 toward the end 2 of the casing and along the outer surface of the tube 11. The particular shape of the vanes 10 forms no part of my invention except that they must be inclined at an angle that will cause the fluid to move longitudinally in the casing when the power unit B is rotated by the shaft 8.

The driven unit is indicated at C and this comprises a cup-shaped member with radially extending vanes 14 that also extend longitudinally of the housing. The vanes 14 are not shaped in the form of a helix or a spiral but are flat and extend throughout the entire length of the cup C. The inner ends of the vanes 14 carry a tube 15 which is similar in size and shape to the tube 11 and is aligned therewith. The outer end of the tube 15 lies substantially flush with the rim of the cup C while the inner end 16 is spaced from the bottom of the cup. Both the tubes 11 and 15 will be rotated when their associate cups are rotated. The cup C is carried by a driven shaft 17 that projects through the end wall 2a of the casing end 2. A thrust bearing 18 is placed between the end wall 2a and the cup C.

I will now describe the means for directing the fluid from the driving member B against the vanes of the driven member C for rotating the driven member in either direction and for controlling the speed of rotation so that the member C will rotate at any desired speed from neutral up to the maximum speed. The outer part 4 of the housing supports the inner part 3 which is cylindrical in form and which has its inner cylindrical surface 19 aligned with the inner surfaces of the cup members B and C. The inner part 3 acts as a fluid guide and conveys the flowing fluid from the power side B to the driven side C. The part 3 carries a plurality of radially extending screws 20 that have their outer ends slidable in bores 21 in the outer part 4, while their inner ends are threaded into bores 22 provided in a central tubular member 23. The member 23 is of the same diameter as the tubes 11 and 15 and connects these two tubes so that a fluid passageway is provided through the center of the device, this passageway being composed of three sections. In order to prevent the fluid that flows through the tube sections from passing out at the joints between the sections, I provide cooperating and overlapping flanges at the joints that will telescope with each other and still permit the tubes 11 and 15 to rotate with respect to the tube 23. The overlapping or telescoping flanges are indicated generally at 24 and 25 in Figure 1.

Figure 4:
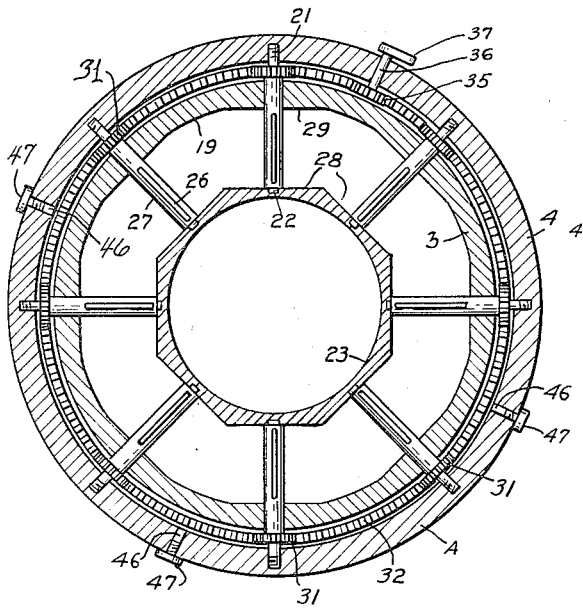
Figure 4 is a section along the line 4—4 of Figure 1.
Figure 5:
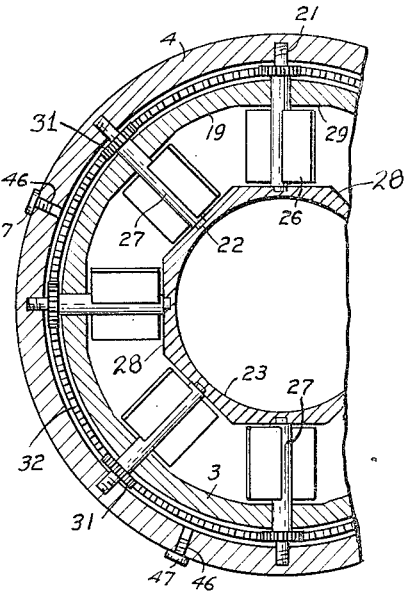
Figure 5 is a view similar to Figure 4 but showing the vanes in an angular position.
Figure 6:
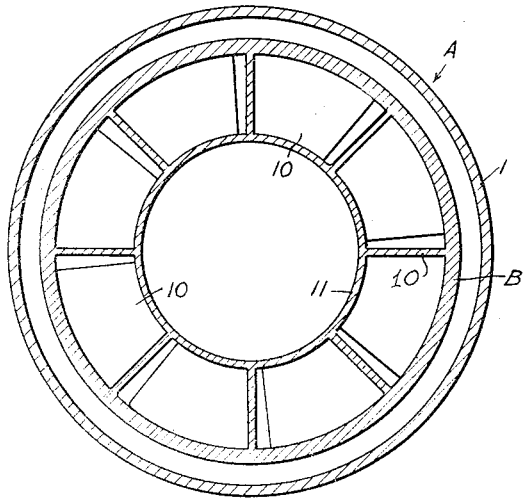
Figure 6 is a section along the line 6—6 of Figure 1.

I mount fluid control vanes 26 between the inner surface 19 of the part 3 and the outer surface of the tube 23. These vanes are carried by sleeves 27 which in turn are rotatably mounted on the screws 20. In Figures 4 and 5 I illustrate the outer surface of the tube 23 as being composed of a number of flat surfaces 28 while the inner surface 19 of the part 3 has flat portions 29. The flat surfaces 28 and 29 are arranged in parallel pairs and are designed to permit the vanes 26 to swing into angular positions while the outer and inner edges of the vanes contact with the flat surfaces. Figure 3 shows each flat surface 28 as being substantially square in shape with the portions of the tube 23 lying beyond the flat surfaces 28 being cylindrical in form. Figure 4 illustrates the inner cylindrical portion 19 of the part 3 connecting the flat surfaces 29 together, while Figure 1 shows the outer edges of the vanes 26 curved at their ends at 30 to permit the vanes to swing into angular positions where their outer edges will extend beyond the flat faces 29.

I have shown eight vanes, although this number may be changed without departing from the spirit and scope of the invention. In actual practice when the vanes are swung into an angle of 45° with respect to the longitudinal axis of the housing, the adjacent vanes will have their ends overlap. The vanes form fluid channels between the power and driven units and they will change the angle of the channels so that the fluid passing therethrough from the power unit will strike the vanes of the driven unit at the desired angle for rotating the driven unit in either direction and at the desired speed. It will also be noted that the change of the angle will increase or decrease the speed of the driven unit. When the vanes 26 are in a longitudinal position with respect to the length of the casing, the driven unit will have its vanes arranged parallel with the control vanes 26 so that there will be no rotative movement imparted to the driven unit. The driven unit will therefore be in neutral position and will not flow in either direction.

I will describe the means for actuating the fluid control vanes 26 before setting forth the operation of the entire device. In Figure 1, I show each sleeve 27 connected to a gear 31 that in turn is mounted in a space provided between the inner and outer parts 3 and 4. Each gear 31 meshes with two ring gears 32 and the ring gears in turn are held in place by spacer rings 33. All of the parts 3, 4 and 32 are held in place by spacer rings 33. All of the parts 3, 4 and 33 are connected together as a unit by cap screws 34. This is only one way of interconnecting all of the vanes 26 together so that an angular movement of one vane will cause all of the other vanes to move likewise.

Figure 7:
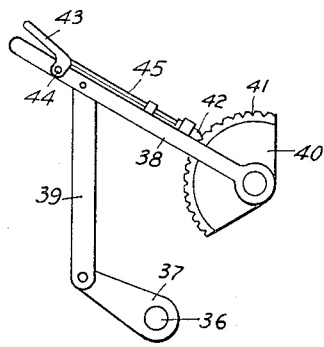
Figure 7 is a schematic view of the manual control for the device.

In Figure 4 I show the gears 31 mounted on the sleeves 27 and I further show an operating gear 35 placed between two of the gears 31. The gear 35 meshes with both of the ring gears 32 and has a shaft 36 that projects through an opening in the casing A. The outer end of the shaft has a lever 37 mounted thereon which may be connected to a manual control lever 38, see Figure 7. A link 39 connects the lever 37 and 38 together. If desired, the control lever 38 may move over a quadrant 40 that has notches 41 in its periphery for receiving a detent 42 which is moved by a hand grip 43 pivoted to the lever 38 at 44. A link 45 connects the hand grip 43 with the detent 42. When the control lever 38 is in the position shown in Figure 7, the vanes 26 will extend in a longitudinal direction in the housing. When the lever 38 is swung clockwise or counter-clockwise from this position, the vanes 26 will be swung angularly and will cause the driven member to rotate in one direction or the other and at the desired speed.

From the foregoing description of the various parts of the device, the operation thereof may be readily understood.

In Figure 4 I show the housing A provided with four openings 46 through which the control shaft 36 could extend. The openings not used are closed by plugs 47. The purpose of more than one opening is to permit the device to be attached to a support and then the control mechanism consisting of the gear 35, shaft 36 and lever 37 connected to that part of the housing where it is convenient to operate. In actual practice the housing A may be provided with a base which may be secured to a supporting frame (not shown) so that the housing will not rotate. As soon as the shaft 8 is rotated, the vanes 10 will cause the fluid to move from the cup B to the cup C along the outer peripherie of the tubes 11, 23 and 15. The fluid will return from the cup C to the cup B by the passage provided in the interior of the tubes 11, 23 and 15. A closed endless circuit for the fluid is provided in this way. I show a plug 48 in Figure 1 for the housing A and this plug may be removed for adding fluid to the housing as required. The fluid may consist of oil so that it will perform a double function of acting as a power medium between the drive and driven members and also acting as a lubricant for the moving parts.

When the vanes 26 extend longitudinally in the casing, the fluid will flow from the power unit to the driven unit in such a manner that the fluid will flow parallel to the faces of the vanes 14 with the result that the driven member will remain stationary. The device is in neutral position when this happens. The operator can cause the driven member to rotate in either direction by merely moving the control lever 38 away from its neutral position shown in Figure 7 in either direction. A swinging of the control lever 38 will swing the lever 37 and this in turn will rock the gear 35 to rotate the ring gears 32 in opposite directions. The ring gears will impart a rotation to the gears 31 that is similar to that which is imparted to the gear 35. The rocking of the gears 31 will swing the control vanes 26 into the desired angular positions by the sleeves 27.

When now the fluid flows between the vanes 26, it will be guided toward the sides of the vanes 14 to impart a rotative movement thereto. This rotative movement is directly proportional to the speed of the fluid and to the angle at which the fluid strikes the surfaces of the vanes. The vanes 14 will be rotated and will rotate the cup C therewith. The cup in turn will rotate the driven shaft 17. It will be seen that the driven member can be rotated in either direction at any desired speed up to the full maximum speed of the device. The standard gear shift is eliminated and a variable speed transmission is provided. The area for the fluid between the tubes and the cups is preferably less than the area provided by the interior of the tube sections. This will create a greater power of the fluid on the driven member because there will be no tendency for a power retarding pressure to develop in the return pipe for the fluid from the driven to the driving member such as would retard the fluid flow.

I claim:

In combination, a housing filled with fluid, a centrally disposed tube extending substantially from end to end of the housing and having an unobstructed interior, a fluid moving member disposed at one end of the housing for moving fluid between the tube and housing, a fluid driven member disposed at the other end of the housing and having vanes acted upon by the moving fluid when the fluid is rotated in one direction or the other, and control vanes placed between the fluid moving member and the driven member for causing the fluid to flow parallel with the vanes of the driven member or to be rotated in one direction or the other against the vanes, said tube and housing having flat surfaces for contacting with the outer and inner edges of the control vanes, the outer corners of the vanes being rounded to permit a swinging of the control vanes into positions where their outer sides will extend beyond the flat surfaces on the housing, the tube returning the fluid from the driven to the drive member through its unobstructed interior.

PERRY V. WHITWORTH.